United States Patent Office 3,420,860
Patented Jan. 7, 1969

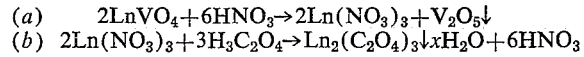

2,420,860
METHOD OF RARE-EARTH METAL RECOVERY FROM ORTHOVANADATE COMPOUND
Richard C. Ropp, Warren, N.J., assignor to Westinghouse Electric Corporation, Pittsburgh, Pa., a corporation of Pennsylvania
No Drawing. Filed Oct. 13, 1967, Ser. No. 675,070
U.S. Cl. 260—429.2        5 Claims
Int. Cl. C07f 5/00

ABSTRACT OF THE DISCLOSURE

Unuseable rare-earth metal orthovanadate is processed to efficiently recover the rare-earth metal constituent for reuse. The vanadate is dissolved in nitric acid or hydrochloric acid and insoluble vanadium pentoxide is filtered out. A specific acid concentration is required for efficient dissolution and recovery. A chelating agent such as ethlenediaminetetraacetic acid is added to complex any alkaline-earth metals present in the solution and an oxalate compound such as oxalic acid is added to cause the rare-earth metals to precipitate as oxalates.

BACKGROUND OF THE INVENTION

Rare-earth metal orthovanadate phosphors have found increased commercial use recently, particularly in color television applications. The rare-earth metals used are very expensive to supply and the present manufacturing techniques for coating the screens result in a considerable amount of the phosphor being rendered unuseable. A method of applying such phosphors to a base and forming a screen is taught in U.S. Patent 3,313,643, dated Apr. 11, 1967.

SUMMARY

It is an object of this invention to provide an improved method for efficiently separating and purifying rare-earth metals from orthovanadate composition to allow reuse of the rare-earth metals.

It is another object of this invention to precipitate the rare-earth metal in a form that is readily useable for preparing efficient phosphors.

It is still another object to provide a method of separating and recovering rare-earth metals from alkaline-earth-metal contaminated orthovanadate composition.

The aforementioned objects and others that will become apparent as the description proceeds have been accomplished by dissolving a predetermined amount of rare-earth metal orthovanadate in a predetermined amount and concentration of nitric acid or hydrochloric acid.

A suspension of insoluble vanadium pentoxide is filtered from the solution. Oxalic acid is added to the filtered solution. When nitric acid is used in forming the inital solution, the rare-earth metal oxalate is precipitated directly upon addition of the oxalic acid. When hydrochloric acid is used in forming the initial solution, the oxalic acid first causes soluble chlorovanadate oxalate complex to form, and upon further addition of oxalic acid the rare-earth metal oxalate is precipitated.

An excess of oxalic acid is used to complex any vanadium pentoxide that remains in the solution and thereby further insure the purity of the precipitated rare-earth metal oxalate. The rare-earth oxalates that are precipitated or coprecipitated have a desirable degree of hydration and are in a form which is directly reuseable for preparing phosphor material.

An organic acid such as ethylenediaminetetraacetic acid may be added to the solution prior to addition of the oxalate compound in order to complex any alkaline-earth metals that may be present in the solution as a contaminant as a result of the manufacturing usage to which the phosphor had been applied.

The present invention provides a method of efficient separation and recovery of rare-earth metals from rare-earth orthovanadate composition. An yttrium-europium orthovanadate is specifically described, but the method is applicable to any of the rare-earth metals much as scandium, yttrium lanthanum and the lanthamide elements that form an insoluble oxalate compound.

The basic reactions utilized when the present invention is practiced with nitric acid are set out below.

(a)   $2LnVO_4 + 6HNO_3 \rightarrow 2Ln(NO_3)_3 + V_2O_5 \downarrow$
(b)   $2Ln(NO_3)_3 + 3H_3C_2O_4 \rightarrow Ln_2(C_2O_4)_3 \downarrow xH_2O + 6HNO_3$ In the above equations Ln is a rare-earth metal or combination of same. In Equation $b$, $x$ is influenced by the solution temperature during precipitation. Similar equations govern the processing of the rare-earth metal orthovanadates with hydrochloric acid except that most of the vanadium remains in the acid solution in a complex state rather than forming the insoluble vanadium pentoxide.

While the above-mentioned equations give the proportions of ingredients required in theory to carry out the dissolution of the vanadate, it has been found that dissolution and recovery can only be efficiently carried out when the acid concentration is within specified limits of gram-moles of acid per liter as well as meeting the minimum theoretical ratio set forth in Equation $a$ of three gram-moles of acid per gram-atom of rare metal. Thus, the acid solution and rare-earth metal orthovanadate should be present in such relative amounts as to provide a gram-mole to gram-atom ratio of acid to rare-earth metal of at least 3/1.

Similarly in Equation $b$, while the gram-mole ratio of oxalic acid to yttrium nitrate is theoretically 3:2, the amount of oxalic acid needed will be dependent on the amount of vanadium remaining in solution which was not removed as vanadium pentoxide. When hydrochloric acid is used to dissolve the rare-earth vanadate, most of the vanadium remains dissolved in the solution and it has been found that about twice as much oxalate compound is required to effect efficient rare-earth recovery. The oxalating compound initially added forms a soluble complex with the vanadium in solution and subsequent addition causes precipitation of the rare-earth oxalate.

DESCRIPTION OF THE PREFERRED EMBODIMENT

Specific Example I

When an orthovanadate phosphor is applied to a glass faceplate the phosphor is generally mixed with a polyvinyl alcohol solution. An excess of the solution is used and a large percentage of the phosphor is not applied to the faceplate. This contaminated excess is separated from the carrier solution by filtration and washed several times in distilled water before drying.

As a specific example of the present invention, 102.0 grams of this dried yttrium-europium vanadate phosphor is weighed out, and a representative ratio of the gram-atoms of yttrium to europium in such a phosphor is 95:5. A nitric acid solution is prepared by adding 194 ml. concentrated $HNO_3$ to sufficient distilled water to achieve a concentration of 13 moles of nitric acid per liter. The vanadate is stirred into the acid solution and heated to about 80° C. A thick red suspension of vanadium pentoxide forms. After maintaining the solution in the heated condition for at least 30 minutes to insure complete dissolution of the rare-earth metal compound, about 620 ml. of distilled water is added and the suspension is filtered to remove the vanadium pentoxide. A substantially clear solution is obtained having a slight green tinge which is indicative of some soluble vanadate remaining in solution. In the next step, 200 ml. of 1.0 M oxalic acid are added to the solution which is reheated to 80° C. and stirred prior to the addition. The oxalate radical first forms a soluble complex with the vanadium, after which subsequently added oxalate forms yttrium-europium oxalate which coprecipitates. Excess oxalic acid can then be added to check the solution. The mother liquor is decanted and the rare-earth metal oxalate is washed in distilled water, rewashed on a filter and dried. The very pure yttrium-europium oxalate obtained is suitable for use in subsequent phosphor preparation. The yield is about 85% of the theoretical rare-earth value contained in the yttrium-europium vanadate that was used.

The molarity of the nitric acid solution in which the rare-earth vanadate is dissolved is a critical factor in accomplishing dissolution and allowing efficient recovery. The molarity of the nitric acid solution is preferred at from 10 to 15 moles per liter. Within this range, the amount of rare-earth metal recovered is greater than 70% of the theoretical amount present in the vanadate.

Example II

As another example, the starting material is 102.0 grams of yttrium-europium vanadate as used in Example I. A hydrochloric acid solution is prepared by adding 259 ml. of concentrated HCl to distilled water to achieve a concentration to 8 moles of HCl per liter. The vanadate is stirred into the acid solution while heating as in Example I and some of the vanadium reacts to form a pentoxide suspension. However, most of the vanadium remains in solution, and after filtration to remove the precipitate the solution is green which is indicative of the vanadium remaining in the solution. To this solution is added about 475 ml. of distilled water. Thereafter, about 400 ml. of oxalic acid are added to the solution and the mixture is reheated and stirred to promote precipitation of the rare-earth oxalates. The added oxalate first forms a chlorovanadate complex with vanadium compound remaining in solution which changes the solution color to blue. Subsequently added oxalate forms yttrium-europium oxalate which coprecipitates. The precipitate is recovered, washed, and dried as explained in Example I.

Since the vanadium remains redissolved to some extent in hydrochloric acid, the gram-mole to gram-atom ratio of oxalate to rare-earth ion in solution required to effect efficient recovery must be about the amount required when $HNO_3$ is used. This occurs because the bulk of the vanadium is removed as vanadium pentoxide when $HNO_3$ is used and the oxalic acid first complexes the small amount of vanadium remaining in solution and then forms the rare-earth metal oxalate. When HCl is used, the bulk of the vanadium remains in solution and the oxalic acid added to the solution must first complex this vanadium. Only when this is completed does the additional oxalic acid form rare-earth oxalate. Accordingly, approximately twice as much oxalic acid is needed when HCl is used instead of $HNO_3$.

The molarity of the hydrochloric acid solution in which the rare-earth vanadate is dissolved is a critical factor in effecting complete dissolution and allowing for efficient recovery. The molarity of the hydrochloric acid solution is preferred at from 5 to 10 moles per liter. Within this range the amount of rare-earth metal recovered is greater than 75% of the theoretical amount present in the vanadate.

In both Examples I and II, after filtering the diluted solutions to remove the vanadium pentoxide suspension a chelating acid, such as ethylenediaminetetraacetic acid in an amount of about 0.5% by volume of the diluted solution, is added to the rare-earth solution to complex any alkaline-earth metal present in solution as a result of the manufacturing usage to which the phosphor has been put. This prevents the alkaline-earth metals from being precipitated as impurities when the rare-earth metal oxalate is precipitated. Other chelating agents for these impurities will be apparent to one skilled in the art.

While oxalic acid was used as the oxalate compound in both of the Examples, other oxalate compounds such as diethyl oxalate, dimethyl oxalate, or dipropyl oxalate can be used to precipitate the rare-earth metal oxalates.

In the foregoing Examples a specified volume of distilled water was used to dilute the rare-earth metal-acid solution. This amount is not critical in the process but enough water must be added to facilitate the separation and filtration of the precipitate from the rare-earth metal compound then in solution.

The amount of water present at the time of formation of the rare-earth metal oxalate crystals does have an effect on the particle size of the crystals produced. This is of course important when the oxalate crystals are to be reused directly for phosphor production.

The rare-earth metal oxalates prepared in Examples I and II were assayed and found to contain on the average four molecules of water per rare-earth oxalate molecule. It is well known in the art that the hydration of the raw-mix material used in phosphor preparation is important in producing efficient phosphors. The production of rare-earth metal orthovanadates when prepared from rare-earth oxalate raw material is best accomplished by a raw material that contains four molecules of water or less. The precipitated rare-earth metal oxalate is therefore readily reuseable for phosphor production.

While the phosphor described in Examples I and II is yttrium-europium vanadate, and specifically had a yttrium to europium gram atom ratio of 95:5 the present method is applicable to rare-earth vanadates in general. Other rare-earth metal vanadates that can be substituted for the yttrium-europium vanadate in the examples include $GdVO_4$, $LaVO_4$, $EuVO_4$, $TbVO_4$, and $ScVO_4$ which may be activated by various rare-earth metals as is well known in the art.

As an example, 136 grams of gadolinium vanadate can be substituted for the yttrium-europium vanadate specified in the examples. Alternatively, 127 grams of lanthanum vanadate, 133.5 grams of europium vanadate, 137 grams of terbium vanadate, or 80 grams of scandium vanadate can also be individually substituted in the examples for the yttrium-europium vanadate.

In the description of the practice of the present invention the phosphor was described as having been contaminated as a result of manufacturing processing with respect to forming a screen coating or a glass faceplate. In such applications, zinc and cadmium could also be expected to be contaminating elements since zinc and cadmium sulfide are other useful screen materials. It has been found that these elements also form soluble complexes with the oxalate thereby allowing their separation from the precipitated rare-earth metal oxalate.

It has been determined that the precipitate crystalline rare-earth metal oxalate of a desired particle size the rare-earth metal concentration in solution should be from about 0.3 to 0.8 mole per liter of solution and is preferred at about 0.4 mole per liter. The amounts of water added to the rare-earth metal-acid solution prior to the addition of the oxalating compound effects the crystallinity of the precipitate by varying the relative rare-earth metal molar concentration. While a specific amount of water was added to the solution in the examples this amount can be varied to effect the crystallinity of the precipitate.

The use of an oxalate compound to precipitate the rare-earth metal in solution has several advantages. The oxalate compound initially added to the solution serves to complex any vanadium remaining in solution and this insures the further purity of the precipitated rare-earth oxalate. The rare-earth oxalate is in a compound form which is directly reuseable for producing new phosphor. The rare-earth oxalate can easily be decomposed by heating to provide the rare-earth oxide if desired.

It will be recognized that an efficient method of recovering rare-earth materials from orthovanadate compound that is contaminated has been provided. While a detailed procedure is set forth it is to be understood that modifications readily apparent to one skilled in the art can be made, and the present invention is not to be limited thereto and thereby.

What is claimed is:

1. The method of efficiently separating and recovering from rare-earth metal orthovanadate composition a substantial portion of the rare-earth metal constituent, which method comprises:
    (a) dissolving said rare-earth metal orthovanadate in a solution of nitric acid or hydrochloric acid, said nitric acid being in a concentration of from 10 to 15 moles per liter, said hydrochloric acid being in a concentration of from 5 to 10 moles per liter, said acid solution and said rare-earth metal orthovanadate being present in such relative amounts as to provide a gram-mole to gram-atom ratio of said acid to said rare-earth metal of at least 3/1;
    (b) filtering any insoluble matter from the resulting solution;
    (c) adding to said filtered solution a soluble oxalate compound in an amount sufficient to first react with vanadium remaining in said resulting solution to form a soluble compound and then to precipitate a substantial portion of said rare-earth metal in solution as rare-earth metal oxalate; and
    (d) separating the said rare-earth metal oxalate precipitate from the supernatant liquid.

2. The method as specified in claim 1, wherein nitric acid is used in concentration of preferably about 13 moles per liter, and said soluble oxalate compound is present in such amount as to provide a gram-mole to gram-atom ratio of oxalate radical to said rare-earth metal in solution of at least 3/2.

3. The method as specified in claim 1, wherein hydrochloric acid is used in concentration of preferably about 8 moles per liter, and said soluble oxalate compound is present in such amount as to provide a gram-mole to gram-atom ratio of oxalate radical to said rare-earth metal in solution of at least 3/1.

4. The method as specified in claim 1, wherein a chelating agent for an alkaline-earth metal is added to the filtered solution prior to addition of said oxalate compound.

5. The method as specified in claim 4, wherein said chelating agent is ethylenediaminetetraacetic acid.

References Cited

UNITED STATES PATENTS

| | | | |
|---|---|---|---|
| 2,899,452 | 8/1959 | Gofman | 260—429.2 |
| 2,943,101 | 6/1960 | Peters | 260—429.2 |
| 2,967,088 | 1/1961 | Peters | 260—429.2 |

FOREIGN PATENTS 224,106   9/1959   Australia.

CARL D. QUARFORTH, *Primary Examiner.*

M. J. McGREAL, *Assistant Examiner.*

U.S. Cl. X.R.

252—301.2, 301.4; 23—23